United States Patent [19]
Kobayashi

[11] Patent Number: 4,787,471
[45] Date of Patent: Nov. 29, 1988

[54] POWER TRANSMITTING SYSTEM FOR A FOUR-WHEEL DRIVE VEHICLE

[75] Inventor: Toshio Kobayashi, Tokyo, Japan

[73] Assignee: Fuji Jukogyo Kabushiki Kaisha, Tokyo, Japan

[21] Appl. No.: 52,669

[22] Filed: May 20, 1987

[30] Foreign Application Priority Data

May 23, 1986 [JP]  Japan ................................ 61-119485

[51] Int. Cl.⁴ ............................................. B60K 17/35
[52] U.S. Cl. .................................. 180/249; 192/0.076
[58] Field of Search ............... 180/248, 249, 233, 250, 180/247; 192/0.07, 0.075, 0.076, 103 R, 103 F, 109 F

[56] References Cited

U.S. PATENT DOCUMENTS 4,481,877 11/1984 Takano ................................. 180/233
4,552,241 11/1985 Suzuki ................................. 180/249
4,602,696 7/1986 Taga .................................... 180/233

Primary Examiner—David M. Mitchell
Assistant Examiner—Everett G. Diederiks, Jr.
Attorney, Agent, or Firm—Martin A. Farber

[57] ABSTRACT

A power transmitting system for a four-wheel drive vehicle having an automatic transmission has a central differential operatively connected to an output member of the automatic transmission for providing a full time four-wheel drive vehicle. A fluid operated multi-disk friction clutch is provided for locking the central differential. A hydraulic control circuit is provided for applying line pressure in the automatic transmission to the friction clutch so as to engage it to lock the central differential.

13 Claims, 6 Drawing Sheets

POWER TRANSMITTING SYSTEM FOR A FOUR-WHEEL DRIVE VEHICLE

BACKGROUND OF THE INVENTION

The present invention relates to a system for transmitting the power of an engine of a four-wheel drive vehicle to front and rear wheels, and more particularly to a system for a four-wheel drive vehicle having an automatic transmission and a central differential.

A full time four-sheel drive vehicle having a central differential is well known. In such a vehicle, a differential lock system is provided for preventing the front or rear wheels from skidding. As a differential lock system, a dog clutch device operated by a pneumatic actuator is widely used.

However, if the actuator is operated when the vehicle is stopped or at cornering, the dog clutch does not engage unless the actuator is operated at the time when corresponding dogs coincide with each other. Further, it frequently happens that the clutch engages after some delay under particular driving conditions.

SUMMARY OF THE INVENTION

An object of the present invention is to provide a system which may quickly lock a central differential.

Another object of the present invention is to provide a hydraulic oil friction clutch for locking the central differential so as to vary the clutch capacity thereby controlling the distribution of the power to the driving wheels.

According to the present invention, there is provided a power transmitting system for a four-wheel drive vehicle having an automatic transmission, comprising a central differential operatively connected to an output member of the automatic transmission, a first drive train for transmitting rotation of a first side gear of the central differential to a front drive shaft, a second drive train for transmitting rotation of a second side gear to a rear drive shaft, a fluid operated friction clutch provided between the first and second side gear so as to operatively connect both the side gears for locking the central differential, and a hydraulic control circuit for supplying oil in the automatic transmission to the friction clutch so as to engage it at pressure which increases with an increase of throttle opening degree.

In an aspect of the invention, the hydraulic control circuit is arranged to apply line pressure of the automatic transmission to the clutch, and the control circuit has a solenoid operated control valve for controlling the supply of the oil.

The other objects and features of this invention will become understood from the following description with reference to the accompanying drawings.

DETAILED DESCRIPTION OF THE PREFERRED EMBODIMENT

Figure 1A:
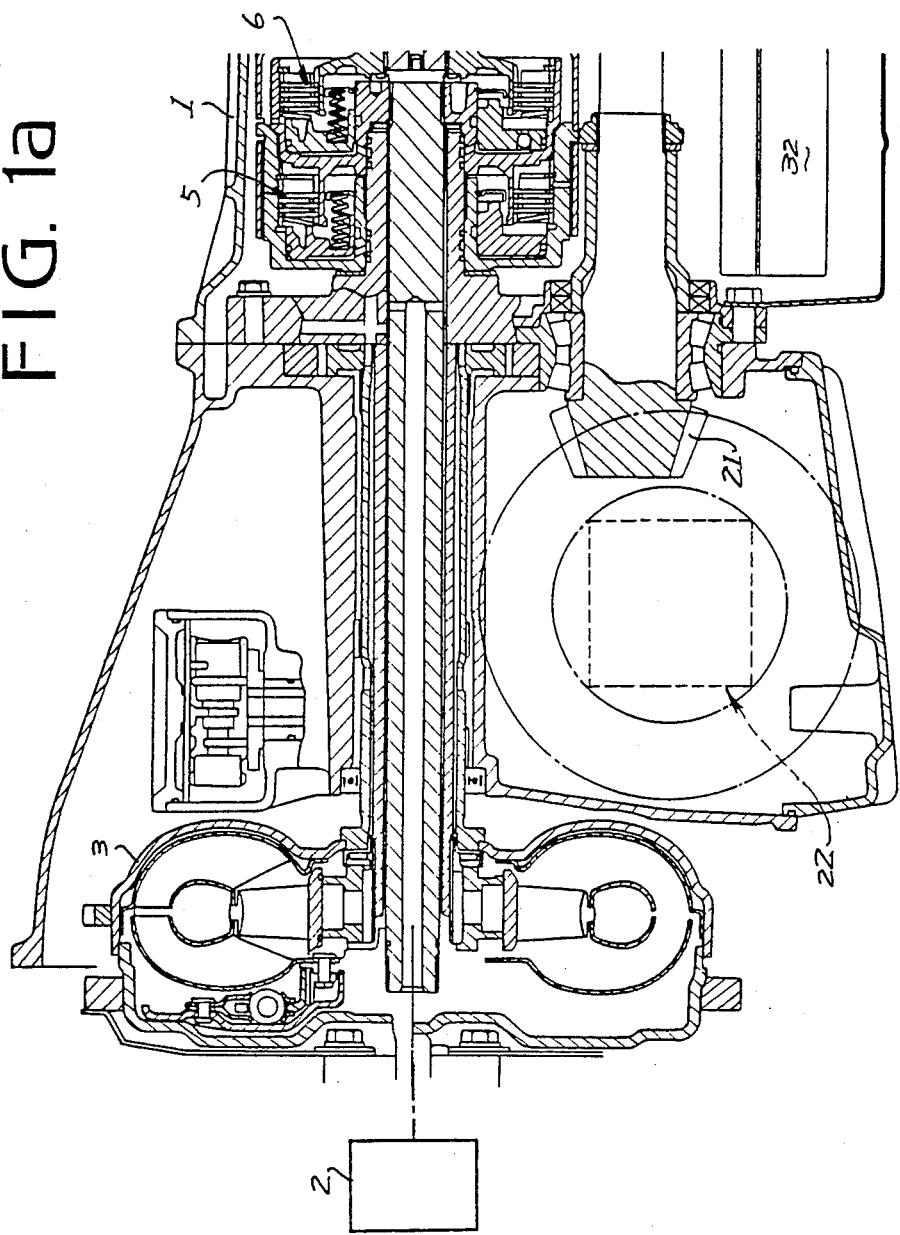
FIGS. 1a and 1b show an automatic transmission employed with a system according to the present invention.
Figure 1B:
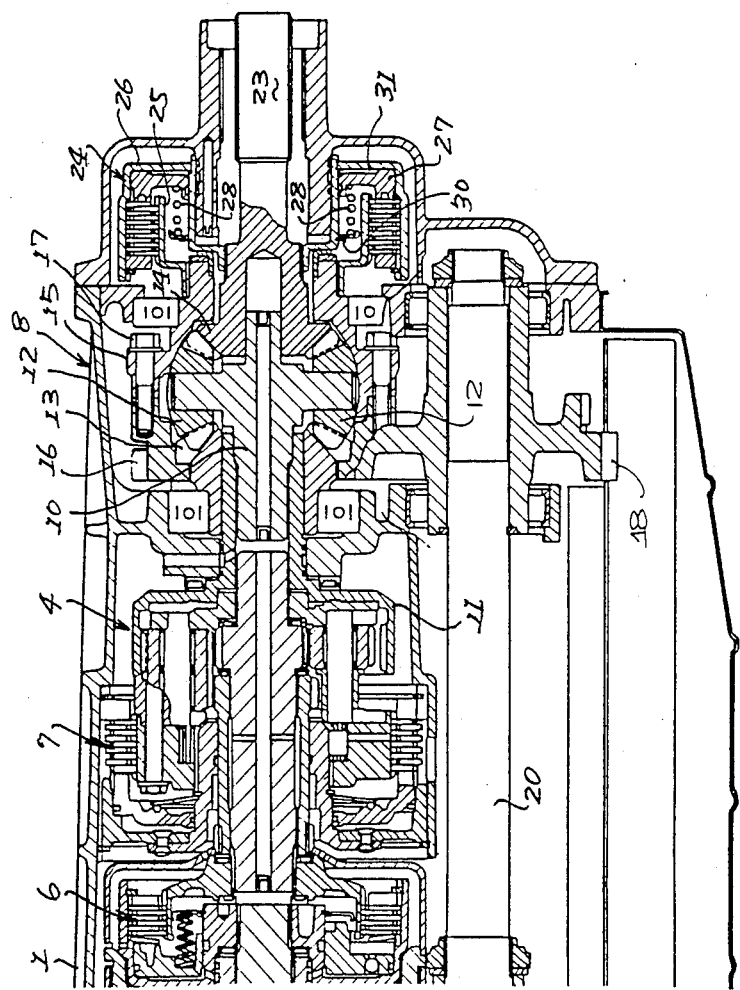
Figure 2:
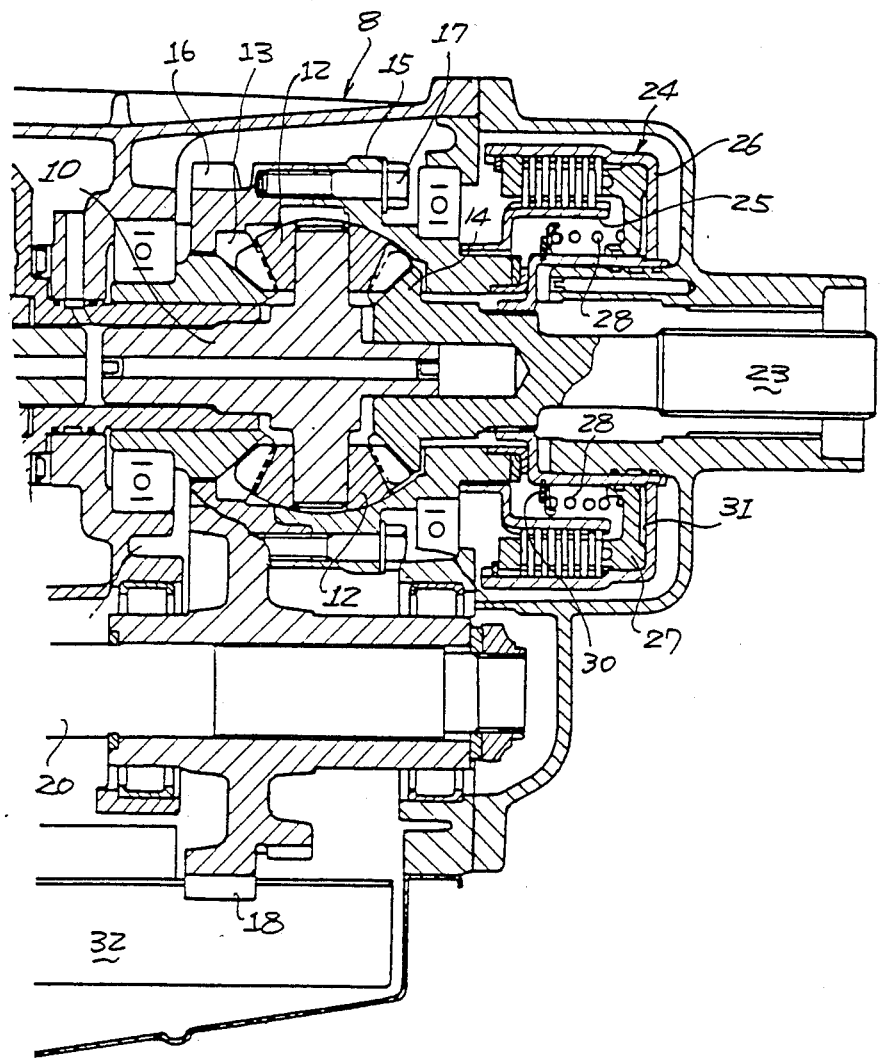
FIG. 2 is an enlarged view showing a part of FIG. 1b.

Referring to FIGS. 1a and 1b, an automatic transmission 1 comprises a torque converter 3 for transmitting the power of an engine 2 to the transmission comprising planetary gear device 4, a reverse clutch 5, a forward clutch 6, low and reverse brake 7, as is well known. A central differential 8 is disposed adjacent a rear portion of the transmission 1.

The central differential 8 comprises a pinion shaft 10 connected to a ring gear 11 of the planetary gear device 4, a pair of pinions 12 mounted on the pinion shaft 10, a pair of side gears 13 and 14 engaged with the pinions 12, respectively, and a differential case 15. A reduction gear 16 integral with the side gear 13 is secured to the case 15 by a bolt 17 and engaged with a reduction driven gear 18. The gear 18 is secured to a front drive shaft 20. Thus, the rotation of the front drive shaft 20 is transmitted to front wheels of the vehicle through a pinion 21 and a front differential 22. On the other hand, the side gear 14 is operatively connected to a rear drive shaft 23 for driving rear wheels of the vehicle through a spline engagement. The central differential 8 is operatively connected to a hydraulic oil multi-disk friction clutch 24 as a differential lock device.

The clutch 24 comprises an inner drum 25 having a plurality of disks and secured to a boss of the differential case 15, an outer drum 26 having a plurality of disks and secured to a shaft of the side gear 14 by splines, a piston 27 slidably mounted in the outer drum 26, and a spring 28 provided between the piston 27 and a retainer 30 secured to the outer drum so as to urge the piston in the clutch disengage direction. An oil chamber 31 between the outer drum and the piston is applied with oil from a hydraulic control device 32 of the automatic transmission, as described hereinafter.

Figure 3A:
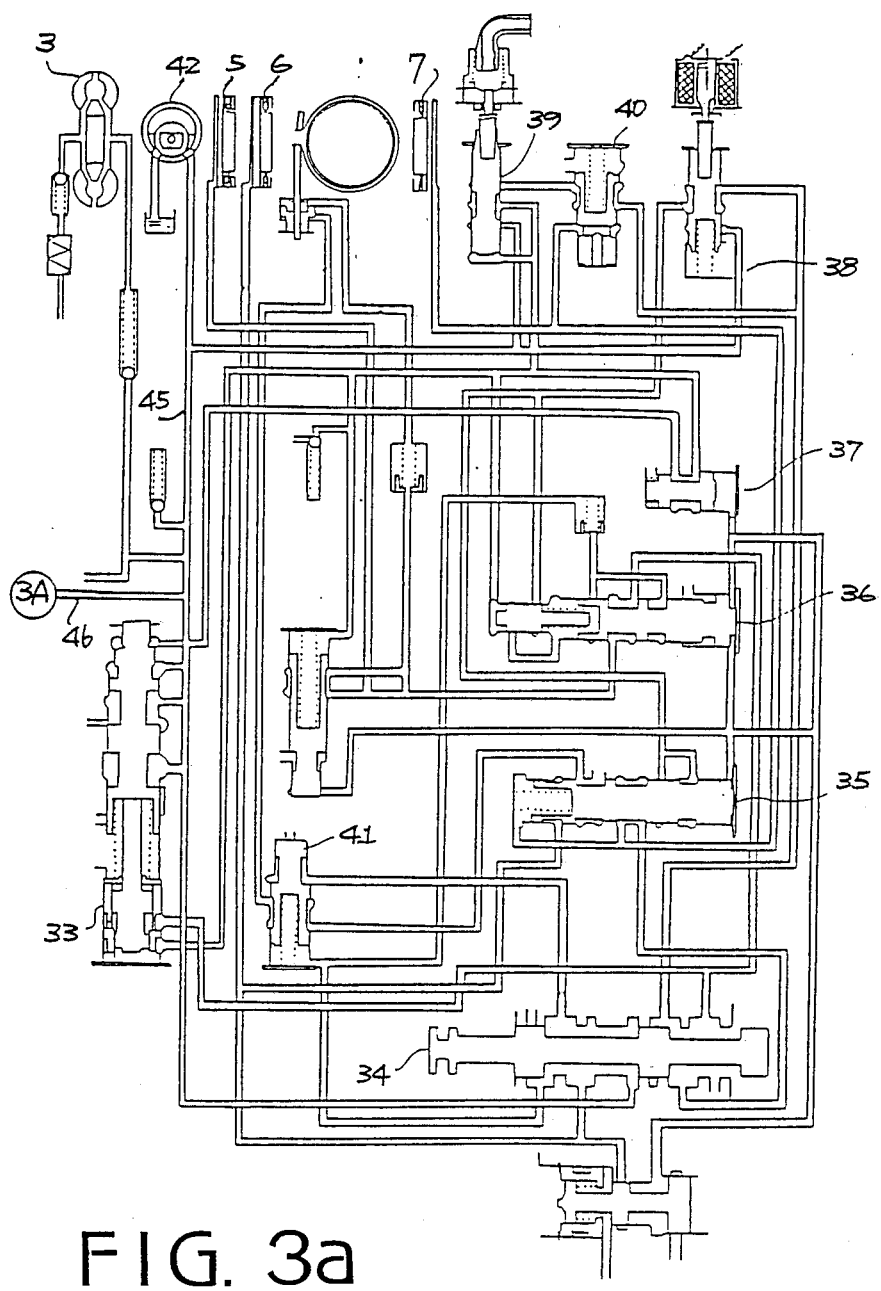
FIGS. 3a and 3b show a hydraulic control circuit for the transmission and the system of the present invention.
Figure 3B:
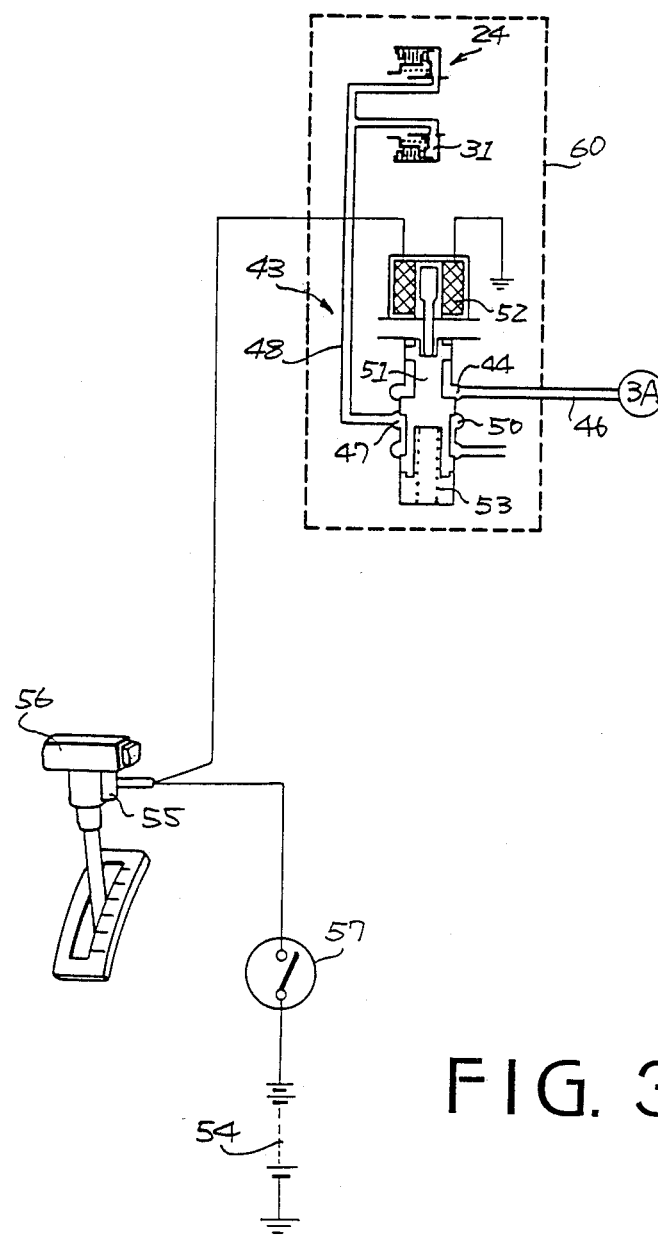

Referring to FIGS. 3a and 3b, showing the hydraulic control circuit, the hydraulic control device 32 has an oil pressure regulator valve 33 for regulating the line pressure of oil supplied from an oil pump 42, a manual valve 34 for selecting driving ranges and others, a 1-2 shift valve 35, a 2-3 shift valve 36, a pressure modifier valve 37, a downshift valve 38, a vacuum throttle valve 39, a throttle backup valve 40, and a second lock valve 41. Since the hydraulic control circuit is well known, more detailed description will not be necessary.

In the system of the present invention, a hydraulic control circuit 60 is provided for controlling the central differential 8. The control circuit 60 comprises a solenoid operated control valve 43 having an inlet port 44 communicated with a line pressure passage 45 of the hydraulic control device 32 through a passage 46 so as to be applied with line pressure, an outlet port 47 communicated with the chamber 31 of the clutch 24 through a passage 48, a drain port 50, a spool 51, a solenoid 52 for shifting the spool 51, and a spring 53 for biasing the spool 51 to a drain position. The solenoid 52 is connected to a battery 54 of the vehicle through a switch 55 attached to a selector lever 56 for operating the manual valve 34 of the automatic transmission and an ignition switch 57.

Figure 4:
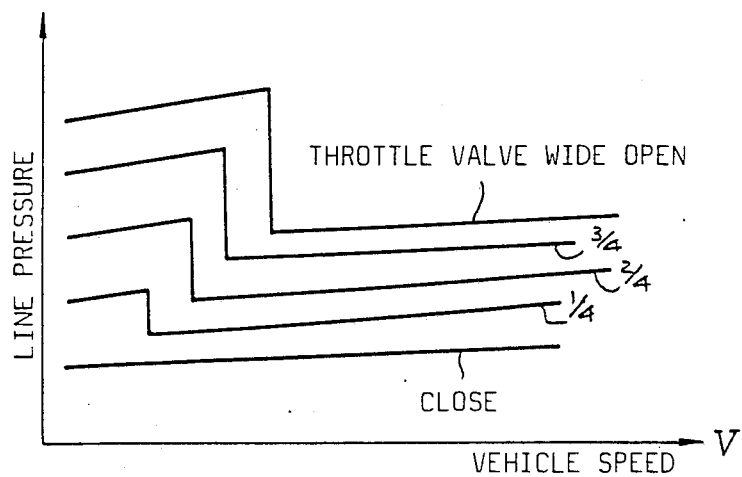
FIG. 4 is a graph showing line pressures in the circuit of FIGS. 3a and 3b.
Figure 5:
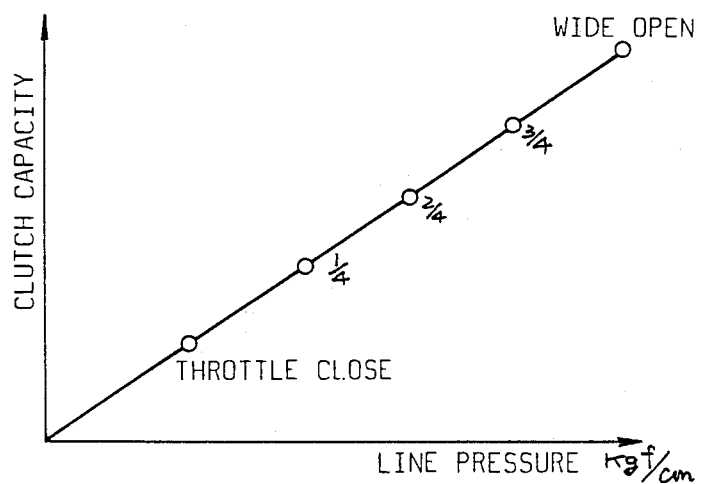
FIG. 5 is a graph showing the relationship between clutch capacity and line pressure.

When the switch 55 is opened, the central differential 8 operates to properly distribute the power of the engine to the front and rear wheels in accordance with driving conditions. When the switch 55 is closed, the central differential 8 is locked at a clutch capacity of the clutch 24 in accordance with the line pressure which is dependent on the opening degree of a throttle valve of the engine as shown in FIG. 4. For example, the clutch 24 is engaged by a line pressure when the throttle opening degree is above one-fourth. At small opening degree of the throttle valve, the line pressure is low, which means a small torque capacity. Accordingly, tight corner braking at low vehicle speed can be prevented. As shown in FIG. 5, as throttle opening degree increases, the clutch capacity increases, thereby preventing driving wheels from skidding at high vehicle speed. On the other hand, tight corner braking can be prevented by the friction clutch slipping at large steering angle and small acceleration.

While the present preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A power transmitting system for a four-wheel drive vehicle driven by an engine controlled by a throttle and having an automatic transmission, comprising:
   a central differential operatively connected to an output member of the automatic transmission, the central differential having a first side gear and a second side gear;
   a first drive train for transmitting rotation of the first side gear of the central differential to a front drive shaft, the latter being operatively connected to front driving wheels of the vehicle;
   a second drive train for transmitting rotation of the second side gear to a rear drive shaft, the latter being operatively connected to rear driving wheels of the vehicle;
   a fluid operated friction clutch provided between the first and second side gears so as to operatively connect both the side gears for locking the central differential; and
   a hydraulic control circuit for applying line pressure of oil in the automatic transmission to the friction clutch so a to engage the clutch at clutch capacity varying according with said line pressure, said line pressure increasing with increase of throttle opening degree, so that distribution of power of the engine to the driving wheels of the vehicle varies with driving conditions of the vehicle.

2. The system according to claim 1 wherein the control circuit has a control valve for controlling the supply of the oil.

3. The system according to claim 2 wherein the control valve is a solenoid operated valve.

4. The system according to claim 1, wherein
   the control circuit engages the clutch via the line pressure such that the clutch capacity of the clutch increases with increasing throttle opening degree.

5. The system according to claim 1, wherein
   the control circuit engages the clutch via the line pressure such that the clutch capacity increases with increasing vehicle speed.

6. The system according to claim 1, wherein
   the control circuit engages the clutch via the line pressure such that the clutch capacity is increased at low vehicle speed lower than a predetermined value compared to the control capacity at vehicle speed above the predetermined value.

7. The system according to claim 6, wherein
   said predetermined value is dependent on throttle opening degree.

8. The system according to claim 7, wherein
   said predetermined value decreases with decrease of throttle opening degree.

9. A power transmitting system for a four-wheel drive vehicle driven by an engine, controlled by a throttle and having an automatic transmission, comprising:
   a central differential operatively connected to an output member of the automatic transmisison, the central differential having a first side gear and a second side gear;
   a first drive train for transmitting rotation of the first side gear of the central differential to a front drive shaft, the latter being operatively connected to front driving wheels of the vehicle;
   a second drive train for transmitting rotation of the second side gear to a rear drive shaft, the latter being operatively connected to rear driving wheels of the vehicle;
   a fluid operated friction clutch provided between the first and second side gears so as to operatively connect both the side gears for locking the central differential;
   a hydraulic control circuit for supplying oil in the automatic transmission with line pressure to the friction clutch to engage the friction clutch in dependency on the line pressure; and
   a vacuum throttle valve, operatively controlled by the throttle, for controlling the line pressure.

10. The system according to claim 9, wherein
    the control circuit rapidly engages the clutch by the line pressure at low vehicle speed lower than a predetermined value.

11. The system according to claim 10, wherein
    said predetermined value is dependent on throttle opening degree.

12. The system according to claim 11, wherein
    said predetermined value decreases with decrease of throttle opening degree.

13. The system according to claim 9, further comprising
    a selector lever, having a switch, for selecting driving ranges, and
    a manual valve acting on the line pressure connected to the switch of the selector lever.

* * * * *